Jan. 30, 1940. C. STEENSTRUP 2,188,781
FREEZING TRAY
Filed March 1, 1935

Inventor:
Christian Steenstrup,
by Harry E. Dunham
His Attorney.

Patented Jan. 30, 1940

2,188,781

UNITED STATES PATENT OFFICE 2,188,781

FREEZING TRAY

Christian Steenstrup, Schenectady, N. Y., assignor to General Electric Company, a corporation of New York Application March 1, 1935, Serial No. 8,874

5 Claims. (Cl. 62—108.5)

My invention relates to freezing trays for refrigerating machines, and more particularly to partition assemblies for such trays.

In many types of refrigerating machines, and particularly in those designed for domestic use, it is common practice to provide a freezing tray or trays. These trays are usually relatively shallow open-top metallic containers. They may be filled with water, ingredients for ice-cream, or other material, to be frozen. The trays are then placed on a surface of the cooling unit of the refrigerating machine in order to freeze the contents of the tray. A partition assembly is commonly provided in freezing trays of this type, in order to divide the tray into a number of small compartments, so that the ice, or other material, will be frozen in small blocks or cubes. The partition assembly is usually arranged to be removable as a unit from the freezing tray and the ice, or the like, contained therein may be removed from the tray with the partition assembly. The blocks of ice, or the like, may then be removed individually from the partition assembly.

It is an object of my invention to provide a partition assembly for freezing trays of the type described which tends to change its shape upon being removed from the freezing tray, in order to facilitate the removal of frozen substances adhering thereto. I accomplish this object by providing a partition assembly including a non-sinuous, resilient longitudinal partition element having a series of relatively rigid laterally extending projections thereon. The longitudinal partition element is inserted in the freezing tray in such manner that it is forced to assume a deformed shape when in position therein with its peripheral portions in contact with the inner surfaces of the freezing tray, and upon its removal from the freezing tray it tends to assume its unstressed shape due to its inherent resiliency, thus breaking the bond between the blocks of ice and the surfaces of the partition assembly which confine the same.

Further objects and advantages of my invention will become apparent as the following description proceeds and the features of novelty which characterize my invention will be pointed out with particularity in the claims annexed to and forming a part of this specification.

Figure 1:
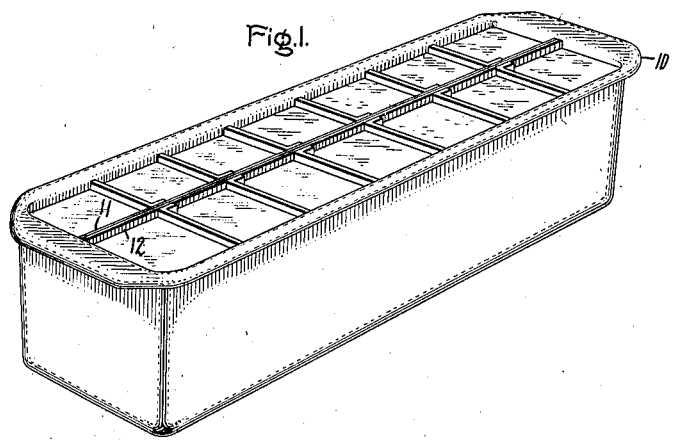
Figure 2:
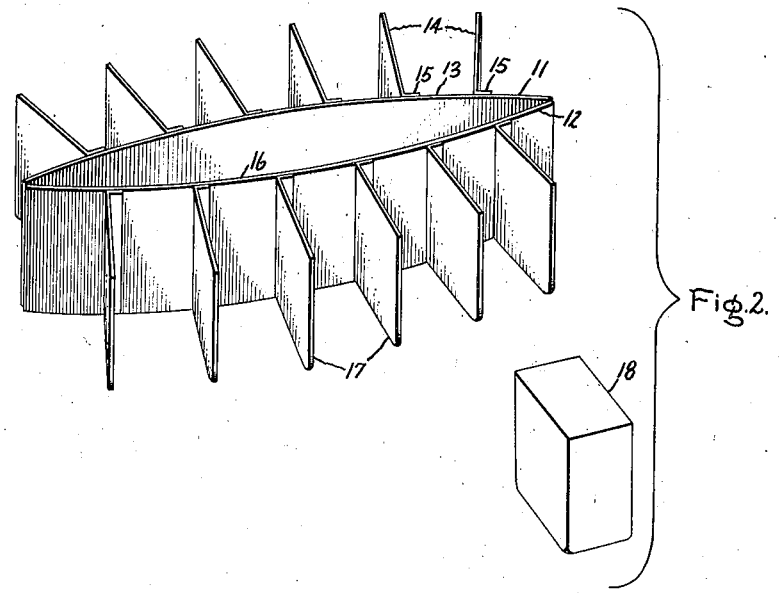

For a better understanding of my invention, reference may be had to the accompanying drawing in which Fig. 1 is a perspective view of a freezing tray containing a partition assembly, embodying my invention; and Fig. 2 is a perspective view of the partition assembly shown in the freezing tray in Fig. 1, and of one of the blocks of ice which has been removed therefrom.

Referring to the drawing, in Fig. 1 I have shown a shallow rectangular open-top freezing tray 10. The freezing tray 10 contains a removable partition assembly consisting of a pair of subassemblies 11 and 12, respectively. The subassembly 11 includes a resilient longitudinal partition element 13 which is preferably made of a rectangular non-sinuous sheet of phosphor-bronze or similar material. The longitudinal partition element 13 is made of such a material as phosphor-bronze, in order that it will be sufficiently resilient that it may be deformed when placed in position in the freezing tray 10 and yet will be sufficiently stiff that it has a strong tendency to spring back to its original form when released from the tray, thus aiding in freeing frozen material therefrom. The longitudinal partition element 13 may also be made of spring steel, but I prefer to use phosphor-bronze because of its resistance to corrosion. Such resilient materials as phosphor-bronze and spring steel should be distinguished from materials such as ordinary soft rubber which are resilient but which lack the necessary stiffness for the purposes of my present invention. The subassembly 11 also includes a series of laterally extending projections formed on the longitudinal partition element 13 by the relatively rigid L-shaped transverse partition elements 14 which are rigidly secured at spaced intervals along the exterior side of the longitudinal partition element 13 and project laterally therefrom in parallel relation. The short base portions 15 of the transverse partition elements 14 are preferably secured to the longitudinal partition element 13 by the fusion of metal, as by spot welding or soldering, for example. In the illustrative form of my invention, the longitudinal partition element 13 is given an arcuate or cambered shape when unstressed, as shown in Fig. 2, the transverse partition elements 14 extending radially from the arcuate surface of the cambered longitudinal partition element 13 when the latter is in its unstressed or normal position.

The subassembly 12 is similar to the subassembly 11 and includes a strongly resilient, comparatively stiff longitudinal partition element 16 made of phosphor bronze, or the like, which is of the same size as the longitudinal partition element 13 and is cambered in the opposite direction with respect thereto. A series of relatively rigid L-shaped transverse partition elements 17 are spot welded, or otherwise rigidly secured, to the exterior side of the longitudinal partition element 16.

When the partition assembly is placed in the freezing tray 10, the inner surfaces of the flexible longitudinal partition elements 13 and 16 are pressed together in face engagement and the entire assembly is then placed within the freezing tray 10. The transverse partition elements 14 and 17 are made of such length that the longitudinal partition elements 13 and 16 will be held in firm face engagement when confined within the freezing tray 10. The freezing tray is then filled with water, or other material, to be frozen.

When the contents of the freezing tray 10 have been frozen, and it is desired to remove the same, the bond between the freezing tray 10 and the blocks of ice, or the like, contained therein may be broken by circulating warm water over the exterior surface of the freezing tray. The partition assembly and the blocks of ice contained therein are then removed from the freezing tray and the subassemblies 11 and 12 are separated. The blocks of ice, such as the block 18, may then be removed individually from the partition subassemblies. If a small amount of water has penetrated between the adjacent surfaces of the longitudinal partition elements 13 and 16, they may stick together. In this case, if the entire assembly is given a sharp blow, as by dropping it on a table, the ice bond between the longitudinal partitions 13 and 16 will be broken and the resilience of the longitudinal partition elements causes them to spring into their natural cambered shape, thus freeing the blocks of ice contained between the transverse partition elements. Moreover, when the partition assembly and ice blocks are removed from the freezing tray 10 they may be placed on a dish or the like and warmed by the room air until the surface of the ice blocks in contact with the partition elements thaws. The longitudinal partition elements 11 and 12 will then assume their cambered form and spread the outer ends of the transverse partition elements or projections 14 and 17, so as to facilitate removal of the ice blocks from the partition assembly.

While I have shown a particular embodiment of my invention in connection with a rigid, metallic, freezing tray I do not desire my invention to be limited to the particular construction shown and described and I intend, in the appended claims, to cover all modifications within the spirit and scope of my invention.

What I claim as new and desire to secure by Letters Patent of the United States is:

1. A freezing tray provided with a removable partition assembly comprising a stiff resilient longitudinal partition element having a cambered shape when unstressed, and a series of transverse partition elements rigidly secured to said longitudinal partition element at spaced intervals along the longitudinal axis thereof and extending laterally therefrom, said resilient longitudinal partition element being deformable upon the application of lateral pressure thereto to a position in which the peripheral portions of said partition assembly conform to the inner surfaces of said freezing tray for reception therein, said resilient longitudinal partition element being returned to its cambered shape by its inherent resiliency after removal of said partition assembly from said freezing tray to facilitate the release of ice blocks or the like from said partition assembly.

2. A freezing tray provided with a removable partition assembly comprising a stiff resilient longitudinal partition element having a cambered shape when unstressed, and a series of transverse partition elements rigidly secured to said longitudinal partition element at spaced intervals along one side thereof and extending laterally therefrom, said resilient longitudinal partition element being deformable upon the application of lateral pressure thereto to a rectilinear form in which the peripheral portions of said partition assembly conform to the inner surfaces of said freezing tray for reception therein, said transverse partition elements being parallel to each other when said longitudinal partition is stressed into said rectilinear form, said resilient longitudinal partition element being returned to its cambered shape by its inherent resiliency after removal of said partition assembly from said freezing tray to facilitate the release of ice blocks or the like from said partition assembly.

3. A rectangular freezing tray provided with a removable partition assembly including a stiff resilient longitudinal partition element having a cambered shape when unstressed, said resilient longitudinal partition element having a series of transverse partition elements rigidly secured thereto at spaced intervals along the longitudinal axis thereof and extending laterally therefrom, said resilient longitudinal partition element being deformable upon the application of lateral pressure thereto to a position in which the peripheral portions of said partition assembly conform to the inner surfaces of said freezing tray for reception therein, said resilient longitudinal partition element being returned to its cambered shape by its inherent resiliency after removal of said partition assembly from said freezing tray to facilitate the release of ice blocks or the like from said partition assembly.

4. A freezing tray provided with a removable partition assembly comprising a complementary pair of stiff resilient longitudinal partition elements, said longitudinal partition elements being outwardly cambered when unstressed, and a series of transverse partition elements secured to each of said longitudinal partition elements at spaced intervals along the outer sides thereof and extending laterally therefrom, said resilient longitudinal partition elements being deformable upon the application of lateral pressure thereto to positions in which the peripheral portions of said partition assembly conform to the inner surfaces of said freezing tray for reception therein, said resilient longitudinal partition elements being returned to their outwardly cambered form by their inherent resiliency after removal of said partition assembly from said freezing tray to facilitate the release of ice blocks or the like from said partition assembly.

5. A freezing tray provided with a removable partition assembly including two adjacent stiff resilient longitudinal partition elements, said longitudinal partition elements being outwardly cambered when unstressed, and a series of lateral projections associated with one side only of each of said longitudinal partition elements, said longitudinal partition elements being deformable upon the application of lateral pressure thereto to positions in which the peripheral portions of said partition assembly conform to the inner surfaces of said freezing tray for reception therein, said longitudinal partition elements being spread apart intermediate the ends thereof to their outwardly cambered form by their inherent resiliency after removal of said partition assembly from said freezing tray to facilitate the release of ice blocks or the like from said partition assembly.

CHRISTIAN STEENSTRUP.